United States Patent [19]

Takamagari et al.

[11] Patent Number: 5,672,099
[45] Date of Patent: Sep. 30, 1997

[54] METHOD FOR COLLECTING CONVEYOR SUSPENSION HANGERS, SUSPENSION HANGER COLLECTING APPARATUS AND SUSPENSION HANGER RETURN APPARATUS

[75] Inventors: Munenori Takamagari; Yoshito Harada, both of Hiroshima, Japan

[73] Assignee: Fukutome Meat Packers, Ltd., Hiroshima, Japan

[21] Appl. No.: 634,908

[22] Filed: Apr. 18, 1996

[30] Foreign Application Priority Data

Apr. 19, 1995 [JP] Japan .................................. 7-119101

[51] Int. Cl.$^6$ .................................................. A22C 15/00
[52] U.S. Cl. ........................... 452/187; 452/182; 452/183
[58] Field of Search ................................. 452/187, 188, 452/182, 183, 179

[56] References Cited

U.S. PATENT DOCUMENTS

| 630,935 | 8/1899 | Schnell | 452/182 |
| 3,227,097 | 1/1966 | Chaney et al. | 452/187 |
| 4,195,386 | 4/1980 | Dodd | 452/183 |
| 4,838,036 | 6/1989 | Norrie | 452/182 |

FOREIGN PATENT DOCUMENTS

| 731942 | 5/1980 | U.S.S.R. | 452/183 |

*Primary Examiner*—Willis Little
*Attorney, Agent, or Firm*—Koda And Androlia

[57] ABSTRACT

Method and apparatus for collecting hangers hanging from overhead or a conveyor rail installed in, for example, a meat processing plant and for returning such collected hangers to the conveyor rail including a guide bar installed under the conveyor rail. The conveyor rail and the guide bar are provided with parallel curved portions at the ends so that the end of the guide bar is positioned above the end of the conveyor rail, thus the hangers having been suspended from the conveyor rail are inverted and brought upside-down at the end of the conveyor rail and suspended from the guide bar via the hook portions of the hangers. The thus upside-down hangers are collected on a carrying truck, and they are returned to the conveyor rail using a hanger transfer disk rotatably installed between the carrying truck and the guide bar.

9 Claims, 7 Drawing Sheets

METHOD FOR COLLECTING CONVEYOR SUSPENSION HANGERS, SUSPENSION HANGER COLLECTING APPARATUS AND SUSPENSION HANGER RETURN APPARATUS

BACKGROUND OF THE INVENTION

1. Field of the Invention

The present invention relates to a method and apparatus for collecting hangers which are suspended from overhead rails in, for instance, a meat processing plant and, in addition, for returning the collected hangers to the overhead rails.

2. Prior Art

Conventionally, in plants where meat products such as hams, sausages, etc., are manufactured and processed, overhead rails are installed for transporting meat from slaughtered cows, pigs, etc., which are the raw material of such meat products, to meat processing machines via conveyor suspension hangers which are suspended from the overhead rails. The hangers are moved along the overhead rails, and pieces of meat are hooked to these hangers (particularly to the hooks of the hangers) and transported together with the hangers.

As to the structure of such conveyor suspension hangers, various types of structures are known.

In cases where such conveyor suspension hangers are suspended from a single rail, each of the hangers 100 is obtained by, as seen from FIG. 7b, setting a pair of disks 100a, which are tapered in the horizontal direction, so as to face each other on the upper end of a main body 100b of the hanger so that a recessed area 100d thus formed by the disks is hung on the rail (not shown). A hook 100d which is free to rotate is installed at the lower end of the main body 100b.

In the case of conveyor suspension hangers which run along two parallel rails, each of the hangers 110, as seen from FIG. 7b, comprises two rollers 110a installed side by side so that these rollers are placed on the rails 120. The main body 110b of the hanger 110 is hung downward from the space between the two rails 120, and a hook 110d is attached to the lower end of this main body 110b in a free to rotate fashion.

Generally, however, the main bodies of this kind of hangers are formed from a thick band-form metal material so as to sustain the weight of the suspended load. The upper end portion of the main body is formed in an inverted U shape, and wheels which run on the conveyor rail is rotatably installed in the recessed groove thus formed by the U-shaped main body. The lower end of the main body is bent in the horizontal direction so that the lower end is formed into an L shape, and a hook is rotatably mounted on this L-shaped portion. A space for the conveyor rail is formed between the wheel and the bent portion, and the wheel is engaged with the conveyor rail in this area.

In most cases, a plurality of these conveyor suspension hangers which are required for the intended transportation work are hung on the conveyor rail(s), and respective pieces of meat are hooked to the hooks of these hangers so as to be conveyed to various locations in the meat plant guided by the conveyor rail.

After the use (i.e., after the pieces of meat have been removed from the hanger), a given number of the empty hangers are collected. This is currently done as shown in FIG. 6. In particular, the hangers 50 are collected on a collection rail 60, and then this collection rail 60 is lowered by a cylinder 62 to a height which allows easy removal of the hangers 50 from the collection rail 60. The hangers 50 are removed and transferred by a worker to suspension bars 72 of a carrying truck 70. The carrying truck 70 is then pushed by the worker to a location where the hangers had been initially used.

However, each of these conveyor suspension hangers weighs about 3.5 kg. In addition, the work of taking down 80 to 100 of these hangers per day and then transferring the hangers to the carrying truck is performed by workers who are engaged also in the meat processing task. In other words, this collecting and returning job of the hangers is an additional task for the meat processing workers and is therefore burdensome and inefficient.

SUMMARY OF THE INVENTION

Accordingly, the present invention is obtained in order to eliminate the drawbacks seen in the conventional hanger collecting and returning systems.

The main object of the present invention is to provide a method for collecting conveyor suspension hangers, a conveyor suspension hanger collecting apparatus and a conveyor suspension hanger return apparatus which are designed so that the conveyor suspension hangers which have completed their task are automatically transferred from the conveyor rail to a carrying truck, and in addition the conveyor suspension hangers are automatically returned from the carrying truck to the conveyor rail, thus relieving the workers from additional work burdens.

The above-described object of the present invention is accomplished by a unique method for collecting conveyor suspension hangers (called merely "hangers") which is characterized in that (a) a guide bar is installed beneath a conveyor rail and near the end of the conveyor rail so as to be substantially parallel to the conveyor rail, (b) the end portions of the conveyor rail and guide bar are formed into circular arcs which are concentric but have different radii, so that the end portions of the guide bar execute a "U-turn" and are formed into a "U" shape, thus bringing the end portion of the guide bar to be located above the end portion of the conveyor rail, (c) hangers (that are to be collected), which are suspended from the conveyor rail either directly from the conveyor rail or via rolling members such as wheels or rollers and have hooks which are free to rotate and attached to the lower ends of the main body of the hangers, are caused to come into contact with the guide bar so that the guide bar is positioned inside the bent portions of the hooks of the hangers, (d) and then causing the hangers to be inverted upside-down so that the hangers are engaged with and suspended from the guide bar via the hooks thereof at the end portion of the guide bar and then collected.

The object of the present invention is also accomplished by a unique structure for an apparatus for collecting conveyor suspension hangers which is characterized by the fact that (a) a guide bar which adjusts the orientation of the hangers in a given direction at the end of a conveyor rail is installed along the conveyor rail so that the guide rail is positioned under the conveyor rail, (b) the guide bar is curved downward at an intermediate portion thereof, so that the terminal end of the guide bar is formed to be connected to and disconnected from a suspension arm of a carrying truck. In this apparatus, the guide bar, when viewed from above, crosses the conveyor rail at a given angle and, when viewed from the side or horizontally, gradually descends from the height at which the main bodies of the hooks of the hangers are positioned to the height at which the bent portions of the hooks of the hangers are positioned.

The object of the present invention is accomplished by still another unique structure for an apparatus that returns the collected hangers to the conveyor rail which is characterized by the fact that: (a) the tip end of a suspension arm of a carrying truck is bifurcated, (b) a hanger removing disk which has a cut-out recess formed on its circumferential edge is installed so that the disk can be rotated in the gap of the bifurcated tip end of the suspension arm, (c) a guide bar is installed so that it is curved upward at an intermediate portion thereof and the root end of the curved portion is positioned near the hanger removing disk, (d) a conveyor rail is installed along the guide bar so as to be above the guide bar with a fixed distance in between, the conveyor rail having curved portion which is parallel to the curved portion of the guide bar and a main portion which extends from the end of the curved portion, and (h) a hanger feed-out device is installed between the curved portion of the guide bar and the curved portion of the conveyor rail; so that the hangers collected on the carrying truck are returned back to the conveyor rail by the hanger removing disk which is rotated and picks up the hangers from the carrying truck and then move the hangers to the conveyor rail, the returned hangers are moved to the main portion of the conveyor rail via the curved portion.

With the method and apparatuses as described above, empty conveyor hangers from which pieces of meat have been removed are moved on the conveyor rail; and when the tip end of the guide bar comes into contact with the upper portions of the hooks of the hangers, the centers of gravity of the hooks are put out of balance, and as a result, all the hooks are rotated to face a particular direction. The hooks are moved to the curved portion of the conveyor rail, so that the hangers are inverted and upside-down with their hooks above the main body at the end of the curved portion of the conveyor rail where the end of the guide base is positioned above the end of the conveyer rail. Thus, the hungers are put upside-down and suspended from the guide rail via the hooks thereof. Then, the upside-down hangers are transferred to the carrying truck "as is" via the end of the guide bar connected to the suspension arm of the carrying truck so that the hooks are hung from the suspension arm and thus collected thereon.

Moreover, the conveyor suspension hangers thus collected on the suspension arm of the carrying truck are returned to the conveyor rail. This is done in the following manner: the carrying truck is moved to a starting end of the conveyor rail, and the hanger removing disk is positioned so that it is inside the gap of the fork or the bifurcated end. The disk is then rotated so that the cut-out recess formed on the disk catches the hooks of the hangers, and the thus rotating disk transfers the hangers to the guide rail one by one. The hangers are returned to the conveyor rail main portion by the feed-out device.

Accordingly, human power is used only to move the carrying truck from the terminal end of the conveyor system to the starting end thereof. This, however, can be done automatically. In any event, according to the present invention, collecting hangers from the conveying rail and returning the hangers to the conveying rail can be accomplished without using human power.

DETAILED DESCRIPTION OF THE PREFERRED EMBODIMENTS

Embodiments of the present invention will be described below with references to the accompanying drawings.

The embodiments include a method for collecting conveyor suspension hangers, and the method is described first below.

Figure 1:
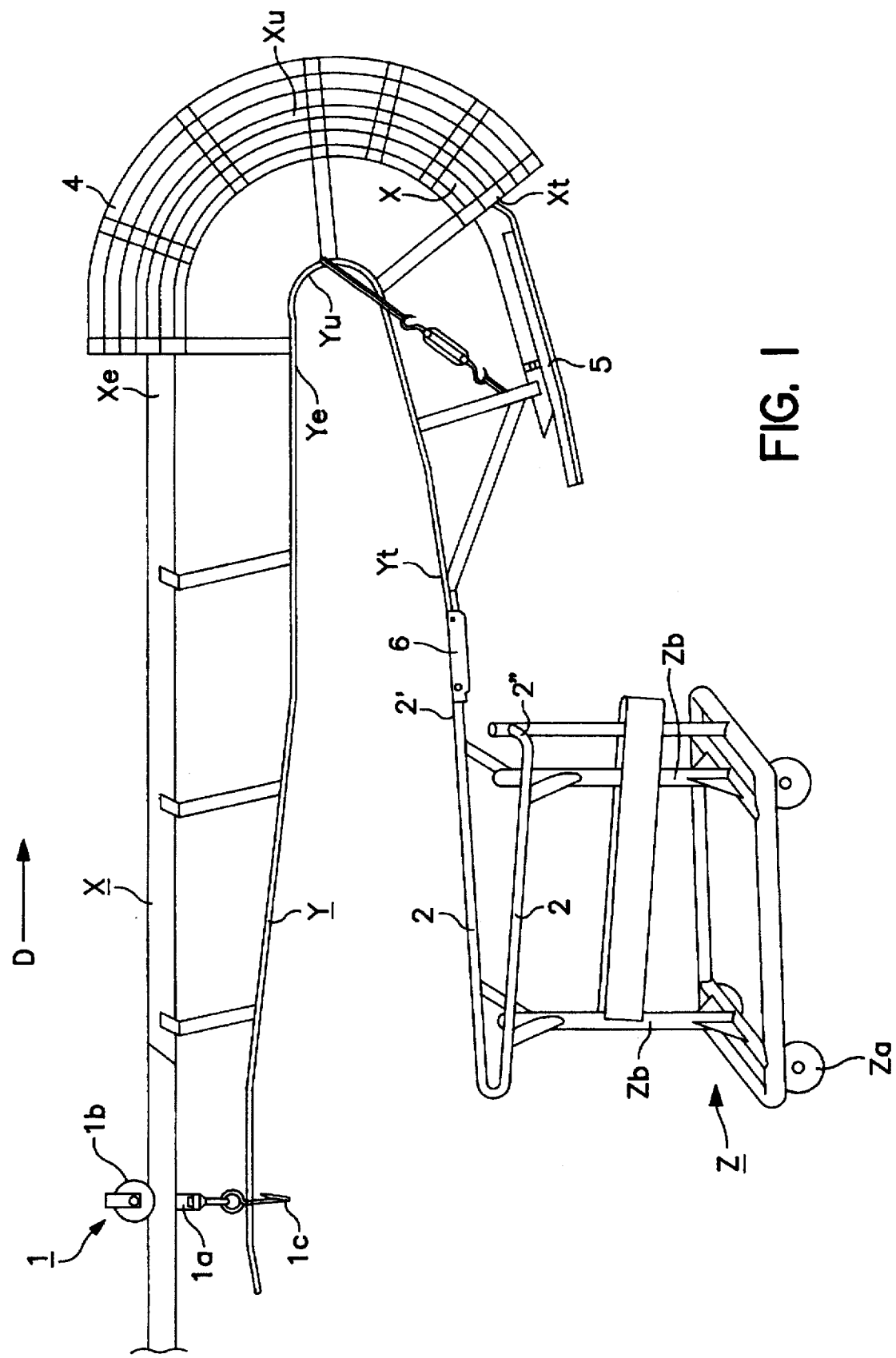
FIG. 1 is an explanatory diagram which illustrates one embodiment of the conveyor suspension hanger collecting apparatus of the present invention.

As seen from FIG. 1, a guide bar Y is provided beneath a conveyor rail (or overhead rail) X at a position so that the guide bar Y is near the end portion Xe of the main, horizontal portion of the conveyor rail X. The guide bar Y is substantially parallel to the conveyor rail X which is hanging from the ceiling of, for example, a meat processing plant.

The conveyor rail X and the guide bar Y include a curved portion Xu and Yu extending from the end portion Xe of the conveyor rail X and from the end portion Ye of the guide bar Y, respectively. The curved portions Xu and Yu are formed into arcs which are concentric but have different radii so that each of the curved portions execute a "U-turn" and form a lateral "U" shape. With these curved portions Xu and Yu, the terminal end Yt of the guide bar Y is positioned above the terminal end Xt of the conveyor rail X as seen in FIG. 1.

Hangers are suspended from the conveyor rail X. Only one hanger 1 is shown in FIG. 1. The hanger 1 comprises, typically, a main body 1a, a rolling member 1b such as a wheel, a roller, etc. provided on the upper surface of the main body 1a, and a hook 1c provided at the bottom of the main body 1a. The main body 1a of the hanger 1 is suspended either directly from the conveyor rail X or by the rolling member 1b so that the hanger 1 is, as a whole, swingable on the conveyer rail X. The hook 1c is free to rotate horizontally (in FIGS. 1, 2 and 4) and is caused to come into contact with the guide bar Y when the hanger 1 is moved on the conveyor rail X. In other words, the guide bar Y is installed at a height wherein the guide rail Y comes inside the bent portion of the hook 1c as best seen in FIG. 2.

Thus, when the hanger 1 is moved towards the curved portions Xu of the conveyor rail X as shown by arrow D, the bent portion of the hook 1c of the hanger 1 comes into contact with the guide bar Y and is rotated horizontally, and then the bent portion is engaged with the guide bar X. In this case, when the tip end of the guide bar comes into contact with the upper portion of the hook of the hanger, the center of gravity of the hook is put out of balance, and as a result, the hook is rotated to face a given direction.

When the hanger 1 is further advanced and slides the curved portion Xu of the conveyor rail X, the hanger 1 is inverted upside-down at the end Xt of the curved portion Xu so that the hanger 1 is suspended from the guide bar Y with its hook 1c engaged with the guide bar Y. As a result, the inverted hanger 1 is released from the end of the conveyor rail X.

Figure 2:
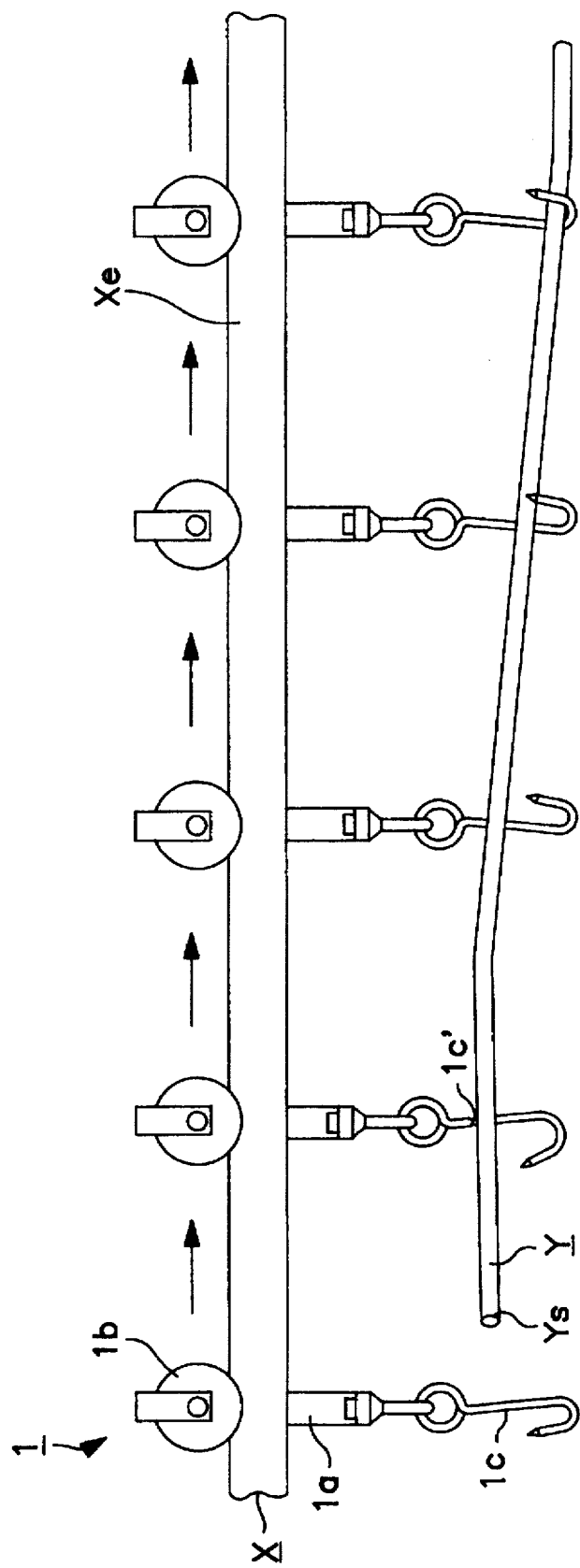
FIG. 2 is a partial front view which illustrates the movement of the hooks of the hangers with reference to the guide rail.
Figure 3:
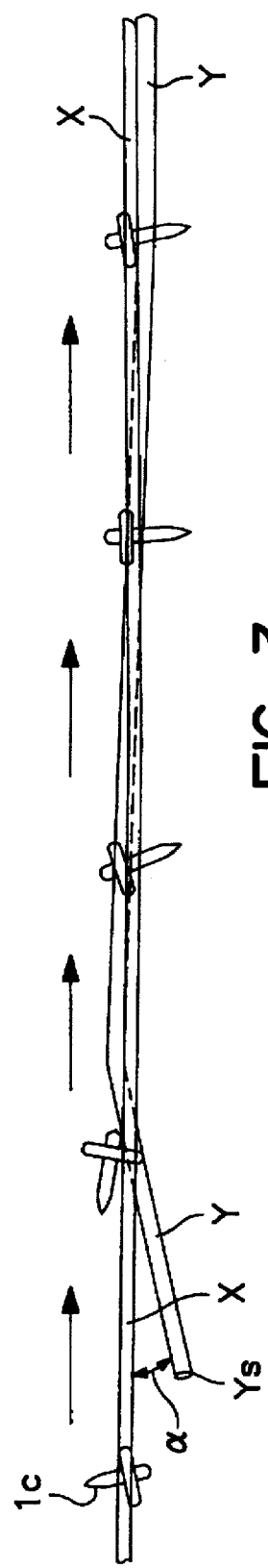
FIG. 3 is a partial top view which illustrates the movement of the hooks of the conveyor suspension hangers with reference to the guide bar.
Figure 4:
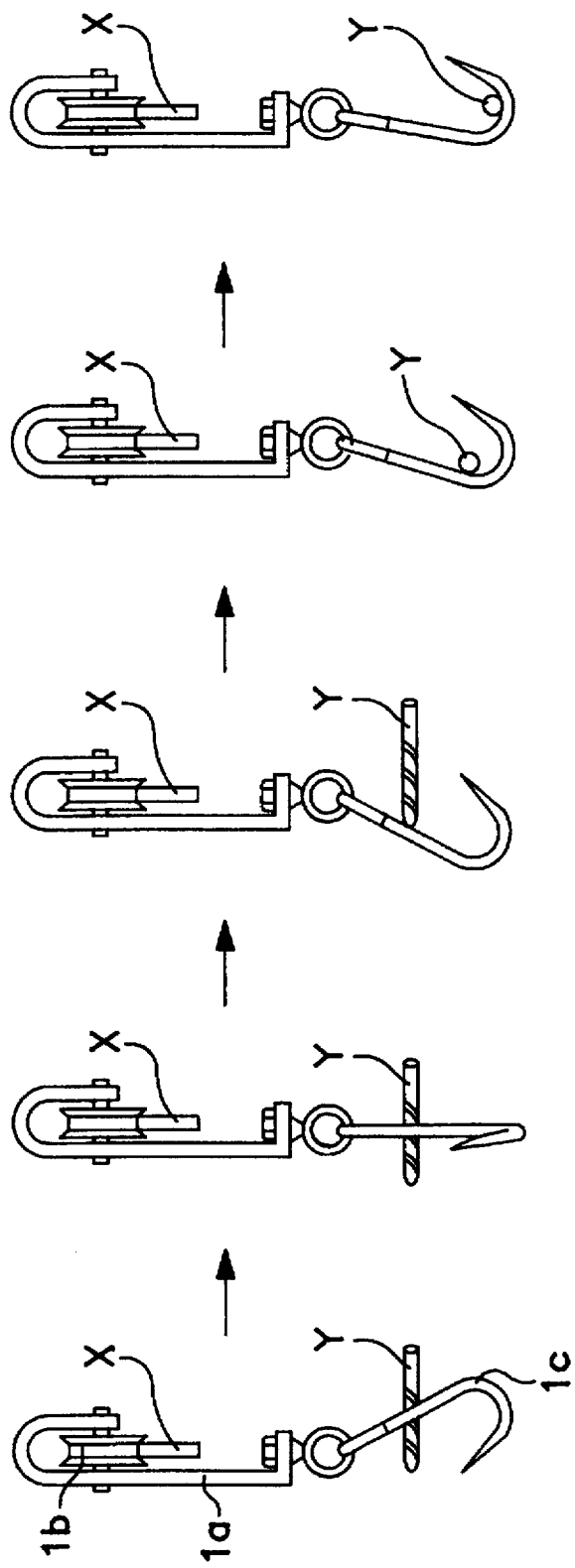
FIG. 4 is a side view which illustrates the movement of the hooks of the conveyor suspension hangers with reference to the guide bar.

More specifically, as shown in FIGS. 2, 3 and 4, the starting end Ys of the guide bar Y is located near end portion Xe of the conveyor rail X. In addition, the starting end Ys of the guide bar Y is located at a height where the guide bar Y can come into contact with the upper portion 1c of the hook 1c of the hanger 1 suspended from the conveyor rail X in a normal posture which is as shown in FIG. 1.

As described earlier, the hook 1c of the hanger 1 is rotatable with reference to the main body 1a, and the hanger 1 is swingable with reference to the conveyor rail X. In addition, as seen from FIG. 3, the guide bar Y installed under the conveyor rail X is designed so that the starting end Ys of the guide bar Y crosses the conveyor rail X at a given angle α when viewed from the above; and as seen from FIG. 3, the guide bar Y is offset from the transfer rail X so that the guide bar Y is located vertically directly below the conveyor rail X only partially. Furthermore, as seen from FIG. 2, the guide bar Y gradually descends, when viewed horizontally, so that the space between the conveyor rail X and the conveyor bar X increases towards the curved portion Yu of the guide bar Y. In other words, the guide bar Y is provided below the conveyor rail X but not parallel to the conveyor rail X when viewed vertically and horizontally, and they have curved portions Xu and Yu which are curved in the same direction.

Since the guide bar Y and the conveyor rail X are positionally provided as described above, the hook 1c of the hanger 1 is, as it is moved towards the curved portion Xu, rotated and oriented in a given direction as seen from FIGS. 3 and 4 by the horizontal and vertical positional relationship between the conveyor rail X and the guide bar Y, and particularly by being hit by the guide bar Y.

The terminal end Yt of the guide bar Y is formed so that it can be connected to and disconnected from a suspension arm 2 provided on a carrying truck Z.

As a result, as seen from FIG. 1, in a successively moving fashion, a plurality of hangers 1 which are inverted upside-down and hung from the guide bar Y are automatically transferred from the conveyor rail X to the suspension arm 2 of the carrying truck Z, so that they are collected on the carrying truck 2.

In FIG. 1, the reference numeral 6 is a connecting assembly which is attached between the suspension arm 2 and the terminal end Yt of the guide bar Y.

Also in FIG. 1, the reference numeral 4 is a safety cover which prevents the hangers 1 from inadvertently coming off of the guide bar Y due to centrifugal force that occurs when the hangers 1 move along the curved portions Xu and Yu of the conveyor rail X and guide bar X. In addition, a braking device 5 is provided at the end of the conveyor rail X. The braking device 5 is provided on the reversed portion or the under surface (in FIG. 1) of the conveyor rail X near the terminal end Xt of the rail X. This braking device 5 slows down the moving or sliding speed of the hanger 1; and it is made from a material which generates friction, for example, rubber, and comes into contact with the rolling members 1b of the hanger 1.

The carrying truck Z includes casters Za which make the carrying truck Z movable in any direction. Supporting posts Zb are installed on the carrying truck Z so that the suspension arm 2 is mounted on the supporting posts Zb. One end of the suspension arm 2, which is brought so as to be connected to and disconnected from the guide bar Y via the connecting assembly 6, is located higher than the other end of the arm 2. This allows the transferred hangers 1 to be successively moved or slid from one (higher) end to the other (lower) end of the suspension arm 2. The suspension arm 2 may be curved at its intermediate area as shown in FIG. 1, or it may be formed straight (not shown).

The present invention includes an apparatus which returns the collected hangers 1 to the transfer rail X.

Figure 5:
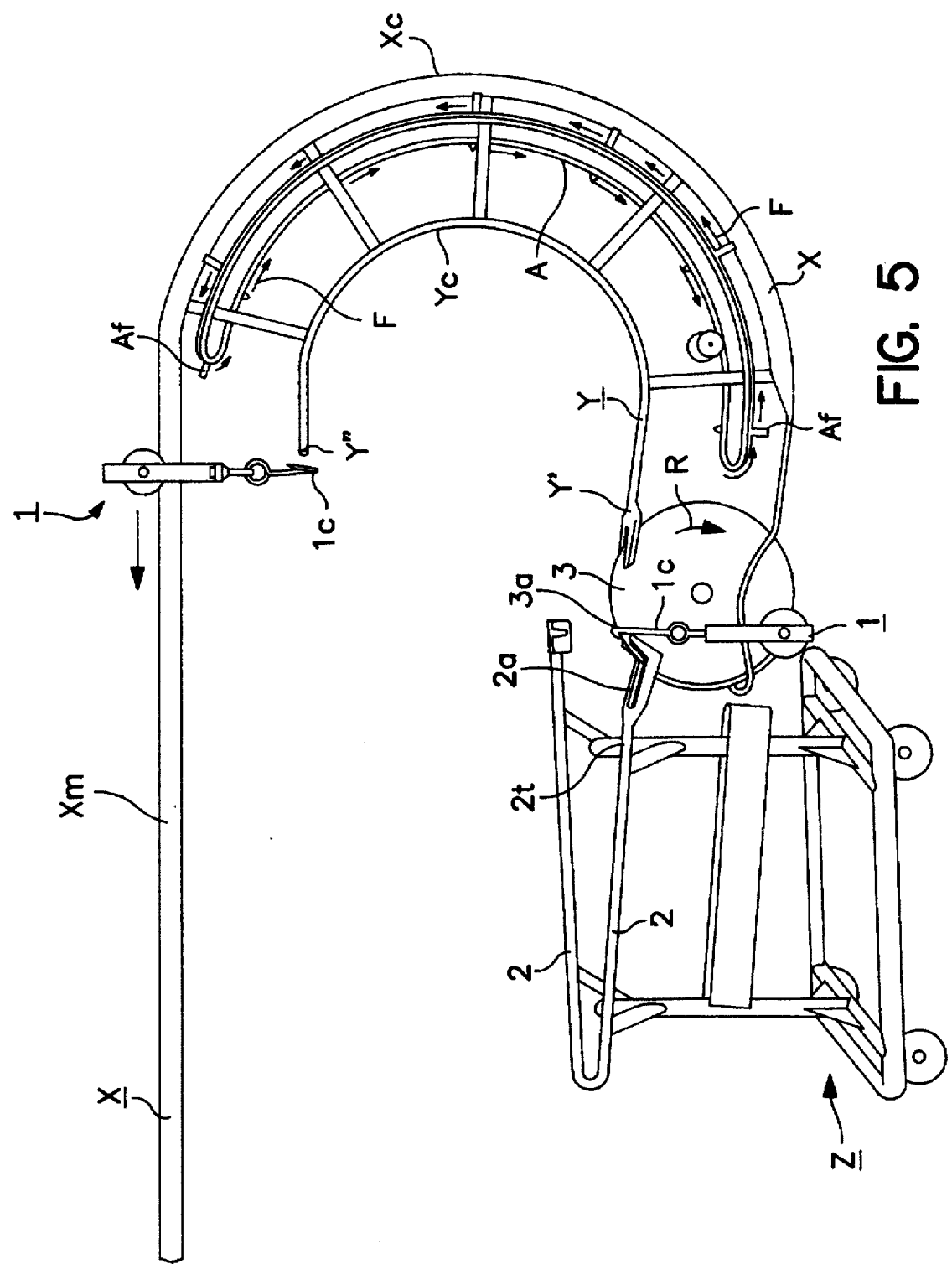
FIG. 5 is an explanatory diagram which illustrates one embodiment of the conveyor suspension hanger return apparatus of the present invention.
Figure 6:
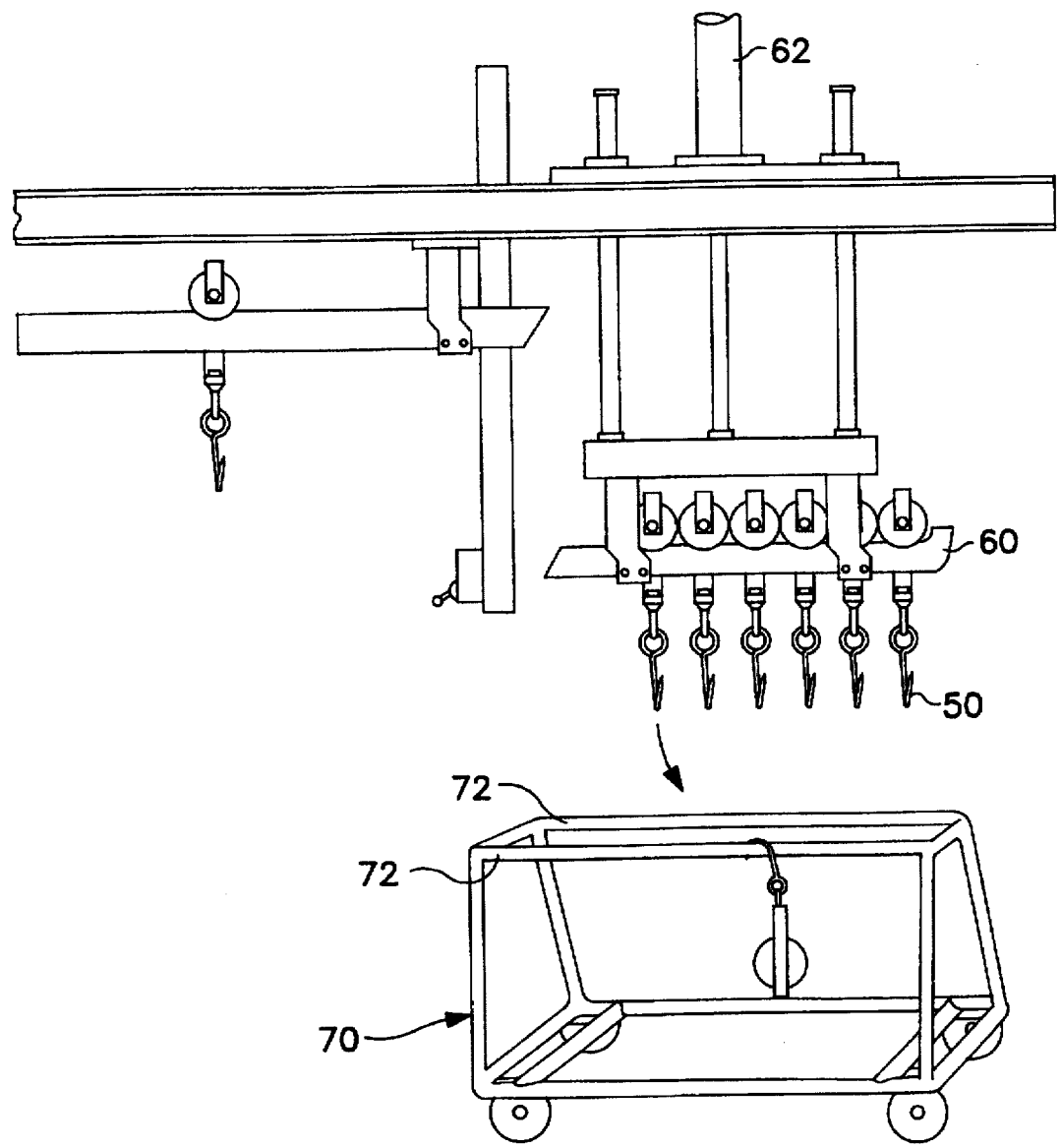
FIG. 6 is an explanatory diagram which illustrates a conventional hanger collecting method.
Figure 7A:
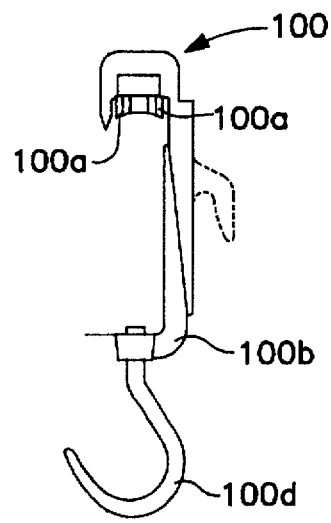
FIGS. 7a and 7b are explanatory diagrams of conveyor suspension hangers.
Figure 7B:
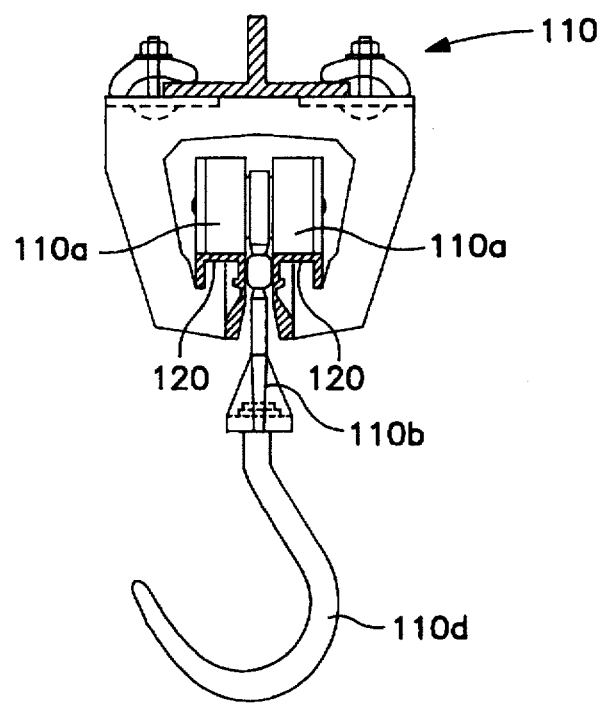

In particular, as shown in FIG. 5, the terminal end 2t of the suspension arm 2 of the carrying truck Z is formed in the shape of a fork 2a or bifurcated and bent upward. A hanger removing disk 3 is provided near the bifurcated end of the suspension arm 2. The hanger removing disk 3 is provided with a cut-out recess 3a on its outer edge and is positioned so that it is inside a gap of the bifurcated terminal end 2a of the suspension arm 2. In addition, the end portion Y' of the guide bar Y is also bifurcated so that the disk 3 is brought into the gap of such a bifurcated end of the guide bar Y. The hanger removing disk 3 is a part of the carrying truck Z and mounted thereon but can be independent from the truck Z. The disk 3 is rotated by a motive force of a motor (not shown) which runs relatively slow in the direction shown by arrows R; in other words, the disk 3 is rotated so that the cut-out recess 3a moves from the bifurcated end 2a of the suspension arm 2 to the bifurcated end Y' of the guide bar Y. The guide bar Y and the conveyer rail X are curved in a vertical direction so as to have arc portions Xc and Yc, respectively, so that the guide bar Y has an upper end Y" which is located under the main part Xm of the transfer rail X and parallel thereto with a predetermined distance in between.

A hanger feed-out device A is provided between the arc portions Xc of the conveyor rail X and the arc portion Yc of the guide bar Y. In particular, the feed-out device A is for feeding the hangers from the tip end Y' to the upper end Y" of the guide bar Y so that the hangers are suspended from the main part Xm of the conveyor rail X, and it is installed between the space which is formed by the curved portion Xc of the conveyor rail X and the curved portion Yc of the guide bar Y. The feed-out device A is an endless belt having a plurality of hooks Af provided thereon at equal distances from each other. The endless belt is rotated in the direction shown by arrows F by a motor (not shown) so as to make a curved route which is parallel to the curved conveyor rail X and the curved guide bar Y.

Accordingly, each of the collected hangers 1 which are suspended from the suspension arm 2 of the carrying truck Z in a reversed, upside-down posture is picked up by the cut-out recess 3a of the hanger removing disk 3, which is rotated inside the bifurcated end 2a of the suspension arm 2 and also inside the bifurcated end Y' of the guide bar Y, and transferred from the suspension arm 2 to the guide bar Y by the rotating disk 3. The thus transferred hanger 1 is hooked by the hook A1 of the feed-out device A, and the rotating feed-out device A carries the hanger 1 to the main rail portion Xm of the conveyer rail X via the arc portion Xc of the conveyor rail X. While the hanger 1 is being carried to the main rail portion Xm, the hanger 1 is brought back into a normal position (in which the hook is down, and the rolling member is up), and the hook 1c of the hanger 1 is released from the end Y" of the guide bar Y, and the hanger 1 is suspended from the conveyor rail X with its rolling member 1b engaged with the upper surface of the conveyor rail X. Thus, the hanger 1 is suspended from the conveyor rail X in the normal upright posture to be used for transferring the piece of meat.

As described in detail in the above, according to the present invention, when the conveyor suspension hangers hanging from a conveyor rail become empty after completion of their task, they are automatically collected at the end of the conveyor rail in a vertically reversed posture. In addition, the guide bar engaged with the hooks of the hanger is connected to a suspension arm of a carrying truck, so that the hangers are automatically transferred to this carrying truck and collected thereon. In addition, these hangers collected on the carrying truck are automatically returned to the conveyor rail. Thus, the present invention has extremely advantageous merits, and the saving of labor is possible, and the hooks of the conveyor suspension hangers can be automatically oriented in a given direction.

We claim:

1. A method for collecting conveyor suspension hangers which is characterized by the fact that:

a guide bar is installed beneath a conveyor rail near an end of said conveyor rail so that said guide bar is substantially parallel to said conveyor rail;

end portions of said conveyor rail and guide bar are formed as circular arcs which are concentric but have different radii so that said end portions execute a "U-turn", thus causing said guide bar to be positioned above said conveyor rail;

main bodies of said suspension hangers that are to be collected are either suspended directly from said conveyor rail or suspended from said conveyor rail via rolling members such as wheels or rollers, etc., and hooks which are free to rotate and located at lower ends of said suspension hangers are caused to contact said guide bar, and said guide bar is installed so that said guide bar is positioned at bent portions of said hooks, thus causing said hooks of said conveyor suspension hangers to be inverted and suspended from said guide bar and collected.

2. A method for collecting conveyor suspension hangers according to claim 1, wherein:

said guide bar is installed so that a tip end of said guide bar is positioned at a height which is such that said tip end is contacted by upper portions of said hooks which are free to rotate and swing on said suspension hangers, and said tip end crosses the direction of advancement of said conveyor rail at a given angle as viewed in a horizontal direction, and said guide bar is further installed so that said guide bar gradually decreases to a point near bottoms of bent portions of said hooks and returns in a same direction as a direction of advancement of said conveyor rail as said hooks move toward an end of said guide bar.

3. A conveyor suspension hanger collecting apparatus which is characterized by the fact that:

a guide bar which adjusts orientations of conveyor suspension hangers near an end of a conveyor rail so that said conveyor suspension hangers are oriented in a given direction is installed along said conveyor rail in a position beneath said conveyer rail;

said guide bar is formed so as to turn downward and to be reversed at an intermediate portion thereof; and a terminal end of said guide bar is formed so that it can be connected to and disconnected from a suspension arm formed on a carrying truck, said connection and disconnection being accomplished by means of a connecting means.

4. A conveyor suspension hanger collecting apparatus according to claim 3 which is characterized by the fact that said carrying truck includes supporting posts installed on a bed of said truck, which has casters, and a suspension arm installed on said supporting posts, said suspension arm being formed so that said suspension arm is higher at an end thereof which is connected to and disconnected from said guide bar and becomes lower toward a terminal end of said arm.

5. A conveyor suspension hanger return apparatus which is characterized by the fact that:

a suspension arm, which is formed so that an arm is higher at one end thereof and inclined so that said arm is lower at another end thereof, is installed on a carrying truck;

said another end of said suspension arm is formed in a shape of a fork;

a hanger removing disk which has a cut-out step formed on its circumferential edge is installed so that said disk can be rotated by a motive force within a gap of said fork;

a terminal end of a guide bar is installed so that said terminal end is oriented in a direction of rotation of said hanger removing disk;

said guide bar is installed so that said guide bar turns upward and is reversed at an intermediate area thereof;

a conveyor rail is installed which is formed as circular arc that is concentric with said guide bar and has a different radius, so that said conveyor rail executes a "U-turn";

hooks of conveyor suspension hangers are engaged with said guide bar, and rolling members of said conveyor suspension hangers are engaged with said conveyor rail; and a conveyor suspension hanger feed-out device which is caused to be rotated by a motive force is installed between said guide bar and said conveyor rail.

6. A method for collecting hangers running on a conveyor rail comprising the steps of:

feeding said hangers to a tip end of a guide bar which is installed under said conveyer rail, said conveyor rail and said guide bar being provided with curved rail and curved bar, respectively, which are curved in a vertical direction so that a terminal end of said guide bar is positioned above a terminal end of said conveyor rail;

feeding said hangers further so that hook portions of said hangers engage with said guide bar after being oriented in a given horizontal direction;

feeding said hangers further so that said hangers are positioned vertically reversed with said hook portions being hung from said guide bar at said terminal end of said guide bar; and releasing said reversed hangers from said guide bar by disengaging said hook portions of said hangers from said guide bar.

7. A system for collecting hangers running on a conveyer rail comprising:

a guide bar provided under said conveyor rail with a space in between so that a hook portion of each one of said hangers is engaged with said guide bar, and curved portions formed at one end of said conveyor rail and at one end of said guide bar, said curved portions being curved downward so that a terminal end of said guide bar is positioned above a terminal end of said conveyor rail, and wherein said hangers are fed towards said terminal ends of said guide bar and conveyor rail so that said hangers are vertically reversed in posture and said hook portion of said each one of said hangers are hung from said terminal end of said guide bar, thus releasing said hangers from said conveyor rail.

8. An apparatus for returning a hanger which has been released from a conveyor rail to said conveyer rail comprising:

a carrying means including a suspension arm from which said hanger which has been released is suspended with a hook portion thereof being engaged with said suspension arm, one end of said suspension arm being higher than another end of said suspension arm and said another end of said suspension arm is bifurcated; and a rotary disk provided near said another end of said suspension arm so that said rotary disk is portioned in a gap formed at said another end which is bifurcated, said rotary disk being provided with a cut-out recess on a circumferential edge thereof, so that said rotary disk, when rotated, picks up said hanger via said cut-out recess and transfer said hangers to a conveyor rail.

9. An apparatus according to claim 8, further comprising a feed-out device which is a rotary endless belt provided with a plurality of hooks thereon, said feed-out device transferring said hanger from an end of said conveyor rail to a main part of said conveyor rail.

* * * * *